US011809930B2

(12) United States Patent
De Blasi

(10) Patent No.: US 11,809,930 B2
(45) Date of Patent: Nov. 7, 2023

(54) SYSTEM AND METHOD FOR ACCURATELY MANAGING THE CONSUMABLES OF A PRINTER FLEET

(71) Applicant: MPS Monitor srl, Milan (IT)

(72) Inventor: Nicola De Blasi, Dorno (IT)

(73) Assignee: MPS MONITOR SRL

( * ) Notice: Subject to any disclaimer, the term of this patent is extended or adjusted under 35 U.S.C. 154(b) by 0 days.

(21) Appl. No.: 17/546,468

(22) Filed: Dec. 9, 2021

(65) Prior Publication Data
US 2022/0207311 A1 Jun. 30, 2022

Related U.S. Application Data

(60) Provisional application No. 63/131,199, filed on Dec. 28, 2020.

(51) Int. Cl.
*G06K 15/00* (2006.01)
(52) U.S. Cl.
CPC .............................. *G06K 15/4075* (2013.01)

(58) Field of Classification Search
CPC ............. G06K 15/4075; G06Q 10/087; G03G 15/556; G03G 15/553; G06F 3/1219; G06F 3/1229; G06F 3/1203
See application file for complete search history.

(56) References Cited

U.S. PATENT DOCUMENTS

| 6,792,216 B2 | 9/2004 | Wachter et al. |
| 7,436,530 B2 | 10/2008 | Terrill et al. |
| 9,134,675 B2 | 9/2015 | Yang et al. |
| 9,573,807 B1 | 2/2017 | Kaufman et al. |
| 10,839,437 B2 | 11/2020 | Goswamee et al. |
| 2015/0003846 A1* | 1/2015 | Yang .................... G03G 15/556 399/27 |
| 2019/0346800 A1* | 11/2019 | Nogawa ............... G03G 15/556 |
| 2021/0245500 A1* | 8/2021 | Hollstegge ........... G06Q 10/087 |

* cited by examiner

*Primary Examiner* — Iriana Cruz
(74) *Attorney, Agent, or Firm* — Clark Hill PLC; James R. Foley

(57) ABSTRACT

A system for accurately managing the consumables of a network of printers. The system monitors the printers in the network, collects data relating to operation of the printers, determines the current state of the printers regarding at least one consumable, and uses the data and the current state of the printers to predict when at least one consumable of at least one printer of the network will need to be replaced.

15 Claims, 4 Drawing Sheets

SYSTEM AND METHOD FOR ACCURATELY MANAGING THE CONSUMABLES OF A PRINTER FLEET

RELATED APPLICATION (PRIORITY CLAIM)

The present application claims the benefit of U.S. Provisional Application Ser. No. 63/131,199, filed Dec. 28, 2020, which is hereby incorporated by reference in its entirety.

BACKGROUND

The present invention generally relates to printer fleet management systems, and more specifically relates to a printer fleet management system which uses data to anticipate the need to deliver printer consumables.

The commercial supply of digital printers and multifunction devices (for simplicity, digital printers, multifunction devices and the like are collectively referred to herein as "printers") has evolved towards a service logic. Specifically, rather than a supplier just supplying an end user (a "customer") with a fleet of printers and effectively walking away, service contracts are the norm in the industry.

A typical printer service contract provides that the supplier supplies the printers to the customer and thereafter printer usage is monitored. The amount paid during the life of the contract typically depends on how much the printers are used. For example, typically the customer has to pay on a "per page" or "per use" basis. As such, a supplier monitors use of the printers to determine what to charge the customer.

A typical printer service contract provides that the supplier is not only responsible for supplying the printers but is also responsible for servicing the printers, such as when they stop working.

Printers consume things such as toner, ink and other useable materials, as well as periodically need certain parts replaced due to depletion. Collectively, these things that a printer consumes are called "consumables." Many printer service contracts also take consumables into consideration and provide that, in addition to having to supply and service the printers, the supplier is responsible for monitoring the printers regarding consumables and either sending replacement consumables to the customer or coming on site to physically replace the consumables.

Typically, a given supplier will be responsible for many printers, at many different locations, for many different customers. As such, printer servicing must be managed efficiently by the supplier in order to satisfy the customer base. This requires managed printer servicing which is made possible by the ability to monitor printers remotely combined with the use of software dedicated to the purpose.

Modern day printers are full of sensors. For example, a modern printer can communicate how many milligrams of ink/toner it has, where the paper is stuck, how many sheets it has printed in each format throughout its entire life cycle and much more. Modern day printers are also connected. For example, all corporate printers now have a network port and most of them can be connected to the Internet via the local network. In fact, there are hundreds of millions of printing devices worldwide already connected to the Internet.

As such, managed print services are common in the industry and they tend to ensure better and more economical management for both customer and supplier, with a number of specific advantages such as with regard to:

Visibility: Immediate reporting on contracts and on the device fleet, with accurate data and historical analysis updated in real time.

Efficiency: Simplification of management processes and delivery of consumables.

Transparency: Data on costs and consumption always available online; clarity in debits and invoices.

Flexibility: option to monitor device fleet dynamics (IMAC) daily.

Trust: more stable supplier and customer relationships.

Operativity: optimum management of all parts of the contract, both operational and financial.

In order to achieve the above-identified objectives, it is essential to utilize a software platform that is dedicated to remote monitoring of the printers, and ensures the management of consumption data flows and volumes of pages produced, the automation of supply chain logistics processes for all consumables, and the provision of remote diagnostics and maintenance services for devices.

The current applicant offers a printer monitoring system (called "The MPS Monitor System") that has been designed and manufactured specifically to achieve the above-identified objectives. The MPS Monitor system provides printer device fleet monitoring and management services to approximately 2,000 Managed Print Services providers and collects data from over 800,000 printers at over 120,000 business customers' premises. This translates into a huge amount of data (several Gigabytes a day) collected by printers and processed within a cloud system, thereby enabling Managed Print Services providers around the world to perform all the activities related to the services provided efficiently and economically.

Some of the main features of the MPS Monitor System include: Immediate and automatic availability of data for page invoicing; fully automated consumables supply chain management; continuous and time-based tracking of the status of alerts management and consumables deliveries; no need for user contact or on-site intervention to collect the above data; predictability of volumes and consumption, and continuous feedback on predictions compared to actual consumption; continuous checks on the use of consumables, how long they last and average toner coverage; and integration with the main management products for fully automated invoicing.

While the MPS Monitor System offers many advantages, and there are other printer monitoring systems commercially available that offer certain advantages, there is room for improvement specifically regarding the monitoring and delivery of printer consumables.

A large part (on average over 70%) of the cost of running an office printing device is related to the cost of its consumables (i.e., the cost of toner, drums, paper and electricity is much higher than the device itself). Furthermore, a large part of a printer's toner and paper is wasted for various reasons, most of which are out of a supplier's control. Printers need continuous replacement of spare parts and frequent service and maintenance—i.e., the more you print, the more attention the printer needs.

Many of the operational processes and costs related to managing a printer device fleet are focused on the supply and optimized management of consumables, according to their periodic depletion and consequent need for replacement. All office printer consumables are marketed with a manufacturer's stated yield. This information is entirely theoretical and is only accurate when the device is used under laboratory conditions and following a specific standard of use: the ISO/IEC 19752 standard. In a nutshell, the ISO/IEC 19752 standard determines the theoretical yield of a consumable, i.e., it assumes that the printer will print pages that are all the same and 5% of the available surface of each page is covered with toner or ink. Using this standard, printer and consumable manufacturers publish the theoretical yield of the cartridge according to a universally valid parameter, i.e., the cartridge will produce a certain number of standard pages at 5% coverage. In other words, if the printer prints only standard pages with the 5% of the surface covered, the consumable will produce exactly the number of pages declared by the manufacturer.

The reality of any office printer is, of course, very different: printers can produce documents that contain extremely variable amounts of consumables, depending on how much text and graphics there are on each printed page. For example, a printer that prints leaflets and commercial brochures full of graphics and colors will see its consumables run out long before the theoretical duration, while another printer, even in the same office, that prints only very simple letters or forms with very little text and no graphics could see its consumables last significantly longer than the theoretical duration declared by the manufacturer.

This extremely variable behavior results in considerable difficulty in calculating the main financial and operational parameters on which to base the provision of Managed Print Services. For example, from an operational point of view, the supplier must ensure the supply of consumables to the customer at the right time when the printer needs them: not too early, to avoid possible loss or waste of consumables; and obviously not too late, to avoid downtime and disruption of the printing service due to the unavailability of the consumable, resulting in the printer being unusable. From a financial point of view, it is essential for the supplier to understand the real coverage that their customer will need for documents printed using the managed printer, in order to accurately outline the costs of the service. For example, if the printer will produce documents with a coverage much higher than 5%, the consumables will last much less than the standard, and consequently more consumables will be needed, with obviously much higher management costs. On the other hand, if the printer will produce documents with a coverage on average much lower than 5%, the consumables will last much longer than expected and will lead to management costs much lower than the average suggested by the manufacturer.

Basing consumable deliveries on theoretical values instead of real data hinders the ability to optimize the supply cycle, even though optimization of the supply cycle has a beneficial impact on the supplier's inventory management, which can avoid overstocking of goods, otherwise necessary to prevent the interruption of customers' operations.

SUMMARY

One object of an embodiment of the present invention is to provide a printer fleet management system which uses data to predict the need refresh printer consumables.

Another object of an embodiment of the present invention is to provide a printer fleet management system which determines the actual life span in pages produced and the effective average coverage (i.e., compared to the theoretical life span and coverage, of each printer and each consumable).

Another object of an embodiment of the present invention is to provide a printer fleet management system which uses data to determine the expected depletion date of each consumable in the printer, based on the number of pages the consumable can still produce at any given time, and the average number of pages the printer produces in the unit of time.

Another object of an embodiment of the present invention is to provide a printer fleet management system which is useable to optimize the printer consumable supply cycle.

Briefly, an embodiment of the present invention provides a system which monitors printers in a network; collects data relating to operation of the printers; determines the current state of the printers regarding at least one consumable; and uses the data and the current state of the printers to predict when at least one consumable of at least one printer of the network will need to be replaced.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION

Figure 1:
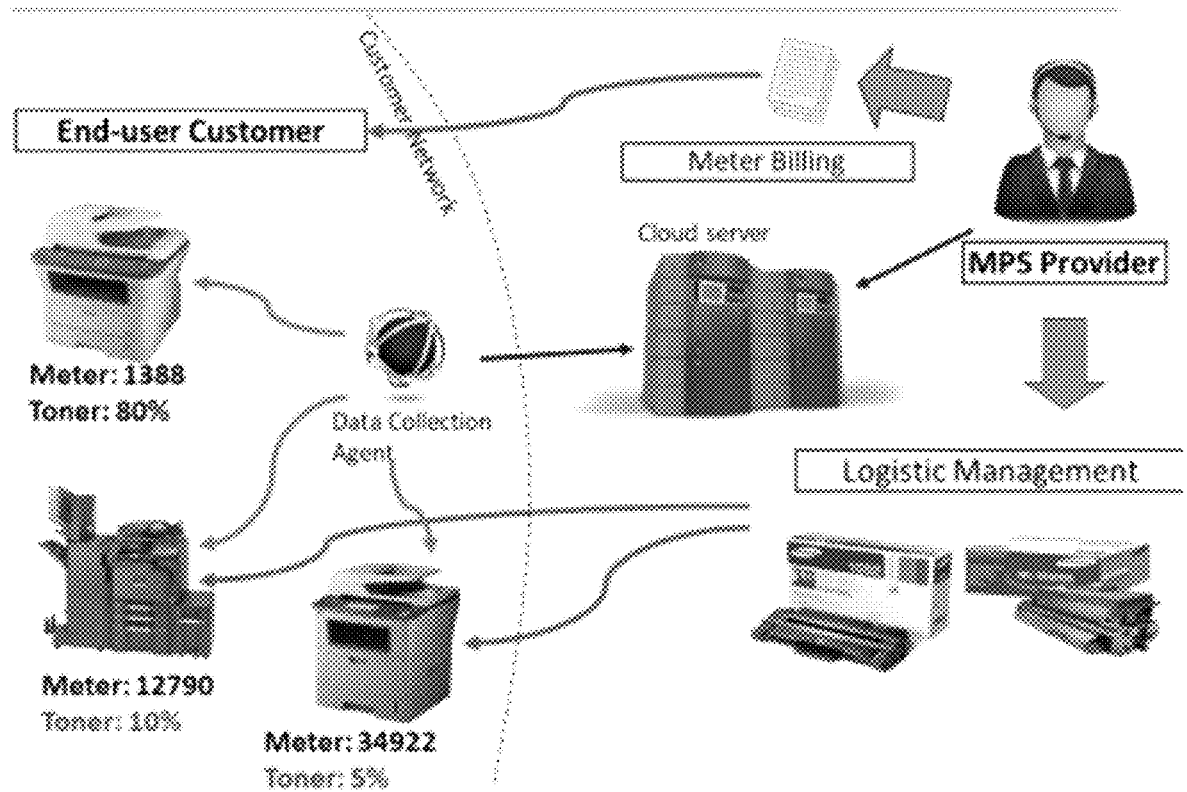
FIG. 1 provides an overview of the architecture and basic functions of a printer fleet management system which is in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention and is not intended to limit the invention to that as illustrated.

FIG. 1 provides an overview of the architecture and basic functions of a printer fleet management system which is in accordance with an embodiment of the present invention. The architecture consists of software modules (called "Data Collection Agents (DCA))" installed at customers' premises which collect data from printer sensors located in printers in the customers' networks (a fleet of printers is shown on the left hand side of FIG. 1). A cloud server (or multiple servers, but for simplicity "cloud server" is used herein the refer to the entire cloud platform) is also provided. The cloud server is preferably accessible via the Internet and is dedicated to storing, cleaning and standardizing the data collected by the DCA's. With regard to who exactly can access this data via the Internet, preferably the architecture is configured to make a customer's data available to that customer, but that is not imperative.

In FIG. 1, "MPS Provider" means Managed Print Service provider, and an embodiment of the present invention is directed to a system used by the MPS Provider, in association with architecture such as is shown in FIG. 1, to monitor the printers in the customer network and deliver consumables in the proper amounts and at the proper times. The system is configured to use the printer data that was collected to forecast when a given printer consumable will be needed for a given printer in the network. This allows MPS providers to more efficiently and economically manage business processes related to maintaining in operation the printers at customers' premises, and providing Managed Print Services.

The system effectively improves the accuracy and reliability of data related to the use of consumables and provides both historical and predictive data on coverage and predicted depletion for each consumable. The system is configured to, based on the data collected by each printer over time and comparing that data with the large amount of other data in its database, produce reliable and fully usable results to improve the operational and financial management of the services provided by its customers (i.e., the MPS provider). The system is exclusively based on the data collected by the printers, which is thereafter processed by the system to determine the expected results using appropriate mathematical calculations. Preferably, the system implements validation mechanisms to delete potentially incorrect data and check the degree of reliability of the results produced by the calculation.

Preferably, the system is configured to calculate the following values:

Average coverage of a printer's cartridges, both current and past, broken down by type and color.

Average coverage of a printer, broken down by type and color (preferably, the system aggregates these values to calculate the coverage of multiple printers).

Expected date of depletion of a printer's current cartridge, broken down by type and color.

Number of remaining pages in a printer's current cartridge, broken down by type and color.

Preferably, the system is configured to use these values to provide the MPS provider with useful information in order to, for example: send the consumables to be replaced to the printers immediately before the consumable in use runs out; define the historical profitability of each printer managed, based on actual consumption and volumes produced; and in the event of renewing Managed Print Services contracts and/or replacing existing printers with new ones, predict the future profitability of the new printers depending on their use.

More details regarding the system will now be described using the following nomenclature:

Reference standard: ISO/IEC 19752.

Coverage: area of the sheet covered by the consumable during printing.

Consumable: material that is deposited on the page during printing.

Cartridge: printer component that contains a consumable (or several, separated from one another) and must be replaced when depleted.

Yield of a cartridge: number of pages that can be printed using the cartridge. The data is stated by the manufacturer and is only valid in a defined context (reference standard).

Theoretical consumable yield: see Yield of a cartridge.

Standard cartridge coverage: 5%, average reference value used to declare the expected yield of a cartridge.

Cartridge depletion: situation in which the cartridge no longer supplies consumable for printing, due to depletion of the cartridge.

Estimated depletion date: date on which the cartridge is expected to run out.

Number of remaining pages: number of printable pages before the cartridge runs out.

Level: quantity of consumable, expressed as a decreasing percentage from 100% (new consumable) to 0% (spent consumable) in a cartridge at any given time.

Residual consumable level: see Level.

Real consumable delta: difference in recorded consumable level between two readings.

Consumable used: see Real consumable delta.

Counter: number of pages printed during the life of the printer, can be reset due to technical intervention.

Type of consumable: toner, photoconductor, etc.

Color for black and white printers: black.

Color for four-color printers: black, cyan, magenta, yellow.

Consumable alert/warning: a notification from the system (not the printer) that the consumable cartridge is running out; the data and values on which the creation of the warning is based can be set (e.g. level of consumable and quantity, remaining pages and quantity, expected date of depletion and remaining days).

Shipments: application function that manages the shipment of consumable parts to printer users.

First data segment: first detection of printer levels and counters.

Second data segment: printer data related to cartridge changes made over time.

Third data segment: current printer data relating to the cartridge in the machine at the time of the last reading in the system.

Preferably, the system is configured to calculate the coverage and remaining life of the cartridges installed in the printers in the network based on consumption, printed pages and the number of days between one reading and the next. After performing validity checks, preferably the system creates a filter list containing the printers to which the calculation can be applied. The system then uses the filter to create a list of cartridge replacements and a list of average durations (real and theoretical) of consumables used.

By combining this data with the data in the database, three lists are created, representing the three main phases of a printer's life cycle, namely: device installation; cartridges used in the past; and the cartridge that is currently in the machine. Combining these lists and subsequently making appropriate calculations gives the coverage and the expected remaining yields of the current cartridges.

Preferably, the system is configured to calculate the remaining yield on the penultimate cartridge used and the result is compared with the real replacement date. The difference, measured in days, establishes the reliability of the data collected by a specific device. This calculation, called "historical simulation," can be performed on any day that the cartridge is in place. To ensure the results are standardized and to be able to aggregate them later, preferably the historical simulation calculation is done when the level of the consumable is divisible by 5, in the range 95-5.

Data that relates to operation of the system may include: Identifiers of the printers to be processed (processing can be performed on all or only one printer in the network); the start date for data analysis (in some cases, especially for devices that have subsequently corrected faults, it may be useful to limit the initial date of data analysis); the maximum number of days the printer has not sent data (the failure to send data for long periods of time is almost always a sign of a problem (this value can be used to decide how many days may pass without communication before excluding the devices from calculations)); performance of the "historical simulation" calculation (as discussed previously); the level of consumable for which the calculation of "historical simulation" is to be performed; grouping of printers of the same brand and model—in other words, when a calculation is applied to a specific device, preferably there is an option to include other devices in some calculations (theoretical average yield of the cartridges) (as long as the devices are the same brand and model as the one you are looking for); and maximum coverage eligibility threshold (i.e., wherein the threshold is the level beyond which coverage is no longer considered correct (see Over Threshold Coverage Elimination)).

In order to create a list of printers to guide the entire process, data must be loaded from all printers into the system. To that end, starting from the complete list of printers in the system, preferably the system discards printers without any level data and creates a list that will contain all the printers being processed.

The filter table may include, for example, the following fields: unique product identifier; consumable type; color; brand and model; the printer is being processed; the printer is managed; the printer has data, but the data are older than the set date limit; and the printer has not communicated for a certain number of days (preferably, this value is adjustable and can be set).

In order to create a list of cartridge replacements, cartridge replacement data must be loaded. To that end, preferably the system is configured to populate a list of consumable cartridge replacements using the table containing the data of cartridge changes and related depletion warnings, based on the filters previously set.

The cartridge replacement table may include, for example, the following fields: printer identifier; consumable type (toner, photoconductor, etc.); color; brand and model; cartridge shipping identifier; reading date; color print counter; black print counter; total counter; consumable level; cartridge installation date; installed cartridge identifier; expected yield of the cartridge; shipping for stock purposes; and managed printer.

In order to create a list of expected (declared or calculated) durations for cartridges, the average yields of consumables used by the printers must be determined. To that end, preferably the system is configured to create a list of the average (declared or calculated) yields of the cartridges used by the printers using the complete list of printers in the system and the cartridge replacement and shipping tables. Preferably, the system is configured to record durations according to the following criteria, in descending order of priority: Declared yield of the cartridge installed in the printer (detected by shipments); yield detected by the printer configuration (associated consumables in details), if they may be identified unambiguously (e.g. only one type of cartridge for black toner); average of the historical life of printer cartridges, broken down by type and color; and average of the historical life of printer cartridges of the same brand and model, broken down by type and color.

Preferably, the system is configured to compile an average yield table. The average yield table may include, for example, the following fields: printer identifier; cartridge identifier; consumables type (toner, photoconductor, etc.); color; theoretical yield of the cartridge; calculated average yield; printer brand and model; and managed printer.

In order to create a list containing the initial printer data and the logic used to perform subsequent calculations, a temporary table must be populated of the first data segment. To that end, preferably the system is configured to combine the previous filter lists and average yields durations with the tables containing the initial level and counter data in order to create a list of initial printer data. This list is herein called the "first data segment." The first data segment table may include the following fields: printer identifier; first printer reading date and time; consumable type; color; black counter; color counter; total counter; and calculated average cartridge life.

In order to create a list of cartridge changes, with the data and logic needed to perform subsequent calculations, a temporary table must be populated according to data segment. To that end, preferably the system is configured to combine previous filter lists, cartridge replacements and average yields with shipping and consumable tables in order to create a list of cartridge changes containing all the data needed to begin coverage calculations. This list is herein called the "second data segment." The second data segment table may include, for example, the following fields: cartridge change identifier; printer identifier; cartridge change date; date on which data is collected; consumable type; color; black counter; color counter; total counter; consumable level; cartridge identifier; expected cartridge yield; calculated average cartridge yield; and last alert.

In order to create a list containing the current printer data and the logic used to perform the subsequent, a temporary table must be populated of the last data segment. To that end, preferably the system is configured to combine the full list of printers in the system with the filter in order to create a list of current printer data. This list is herein called the "third data segment." The third data segment table may include, for example, the following fields: printer identifier; last printer data update date and time; consumable type; color; black counter; color counter; total counter; and consumable level.

Preferably, the system is configured to: combine the three data segments (i.e., first, second and third); sort rows of that data according to, for example, printer, consumable type, color, row type (1: initial data, 2: cartridge changes, 3: current data), and date and time; and perform calculations by comparing the values between one row and the next in order to compile a deltas table. The deltas table may include, for example, the following fields: printer identifier; row type; date and time; previous date and time (sort: printer, consumable type, color, row type); difference in days; consumable type; color; black counter; black counter difference from previous row; color counter; color counter difference from previous row; total counter; total counter difference from previous row; consumable level; consumable level difference from previous row; consumable identifier; stated average yield of the consumable; calculated average yield of the consumable; flag last alert in list; new printer flag; flag presence first data segment; and number of cartridge changes.

Preferably, the system is configured to delete any errors resulting from reading the data, such as by deleting negative counter delta. To this end, preferably the system: analyzes the content of the database to identify negative differences between counters (i.e., the value of a counter cannot decrease because it indicates the number of printer pages); resets a counter to zero when a technical intervention involves replacement of some printer components; and in order to manage both cases, where there are several consecutive negative differences, preferably the system deletes only the first one recalculates subsequent ones.

Preferably, the system also deletes negative day delta. To this end, preferably the system: analyzes the content of the database to identify negative differences between days (i.e., it may happen that the dates are not consecutive between one data segment and another); deletes the affected rows; and recalculates the remaining rows.

Preferably, the system also deletes negative level delta. To this end, preferably the system: analyzes the content of the database to identify negative differences between consumable levels; deletes the affected rows; and recalculates the remaining rows.

Preferably, the system also deletes delta days equal to zero. To this end, preferably the system: analyzes the content of the database to identify differences equal to zero between the days of subsequent rows; deletes the affected rows; and recalculates the remaining rows.

Preferably, the system also deletes printers without counters. To this end, preferably the system: analyzes the content of the database to identify printers that do not have pages counters; deletes the affected rows; no need to recalculate the remaining rows.

In order to perform a final coverage calculation, preferably after the system accounts for errors (as discussed above), the system calculates the coverage and the expected remaining duration, preferably expressed in both days and pages. Preferably, the system calculates the coverage for each individual cartridge using the following formula: Real Consumable Delta*5/100*Theoretical Consumable Yield (No. of Pages)/Printed Pages, wherein the theoretical yield of the consumable, if absent, is replaced by the average value calculated for that printer/consumable type/color combination.

Preferably, the system calculates the average coverage by consumable type/color using the following formula: Sum of Real Consumable Delta*5/(Number of items*100)*Sum of Theoretical Consumable Yield (No. of Pages)/Sum of Printed Pages, wherein items are cartridge changes that refer to the same combination of printer/consumable type/color, the sum of values refers to values taken from several items, the theoretical yield of the consumable, if absent, is replaced by the average value calculated for that printer/consumable type/color combination, and the calculated average yield takes into account the actual consumption of the consumable, including in the calculations any residue at the time of replacement.

Preferably, the system calculates the remaining pages using the following formula: Printed pages*Residual consumable level/Consumable used.

Preferably, the system calculates the depletion date based on the current cartridge data using the following formula: Current cartridge installation date+(Days elapsed since cartridge change*100/Consumable used).

Preferably, the system calculates the date of depletion based on the data from the last three cartridges replaced plus the current one using the following formula: Date of fourth to last cartridge installation+[Days elapsed since installation of fourth to last cartridge*(100+sum of real consumption of the three cartridges replaced)/(Sum of consumable used by the last three cartridges replaced+Sum used by the current cartridge)]

Preferably, the system is configured to populate a coverage duration results table. The coverage duration results table may include, for example, the following fields: printer identifier; row type; date and time row; date and time previous row; difference in days; consumable type; color; black counter; black counter difference from previous row; color counter; color counter difference from previous row; total counter; total counter difference from previous row; black counter; consumable level; consumable level difference from previous row; consumable identifier; declared average yield; calculated theoretical average yield; flag last alert; calculated real average yield; actual average yield calculated only on the last three cartridges plus current; coverage calculated between two cartridge changes, or of the current cartridge; average coverage calculated by consumable type and color; remaining pages calculated based on the data of the cartridge currently in use; remaining pages calculated based on the data of the last three cartridges replaced plus the current one; remaining pages calculated based on the data of all replaced cartridges plus the current one; consumable depletion date calculated based on the data of the cartridge currently in use; consumable depletion date calculated based on the data of the last three cartridges replaced plus the current one; date of consumable depletion calculated based on the data of all replaced cartridges plus the current one; monthly print volume, expressed in number of pages; consumable level at reading before cartridge change; and error code.

Preferably, the system is configured to delete rows with negative coverage. For example, due to reading errors not identified in the previous steps, it may happen that the coverage is negative for one or more rows (by its nature, coverage can only have a positive value). If the coverage of a single cartridge is negative, preferably only the corresponding row is deleted. On the other hand, if the coverage calculated for the printer/consumable type/color is negative, preferably all related rows are deleted.

Preferably, the system is also configured to delete rows with very high coverage. For example, due to reading errors not identified in the previous steps, it may happen that the coverage is much higher than the standard reference value (5%). After empirical evidence, a maximum threshold of coverage validity has been established. In these cases, the values are formally correct, but substantially wrong (for example, few printer pages in a very short period of time, with high toner consumption). If the coverage of a single cartridge is above the threshold, preferably only the relevant row is deleted. On the other hand, if the calculated coverage per printer/consumable type/color is above the threshold, preferably all related rows are deleted.

Preferably, the system is also configured to delete rows with very low coverage. For example, due to reading errors not identified in the previous steps, it may happen that the coverage is much lower than the standard reference value (5%). After empirical evidence, a minimum threshold of coverage validity has been established. In these cases, the values are formally correct, but substantially wrong (for example, many printed pages in a very short period of time, with low toner consumption). If the coverage of a single cartridge is below the threshold, preferably only the relevant row is deleted. On the other hand, if the calculated coverage per printer/consumable type/color is below the threshold, preferably all related rows are deleted.

Preferably, the system is also configured to delete rows related to printers having alert management disabled. Without alert management, it's not possible to intercept the changes of the cartridges, and the results of the calculations would be distorted. Preferably all related rows are deleted.

Preferably, the system is configured to save only correct data in a final destination table, and incorrect data is either deleted or saved in the final destination table and marked as invalid. Preferably, the errors are recorded in a dedicated table, which collects the details. The final destination table may include, for example, the following fields: printer identifier; consumable type; color; row type; initial printer status identifier; alert identifier; cartridge installation date; cartridge replacement date; data reading date; consumable level; delivery identifier; serial number of the consumable shipped, where relevant; item number of the consumable shipped, where relevant; nominal life of the consumable shipped; value of consumable shipped; identifier of the consumable present in the printer details; item code of the consumable present in the printer details; nominal life of the consumable present in the printer details; value of the consumable present in the printer details; printer pages; calculated theoretical average yield of the consumable; effective average yield of the consumable; single cartridge coverage; coverage for the printer/consumable type/color;

residual pages; date of depletion; monthly print volume; error code; and date and time of calculation.

While several possible tables and fields have been described hereinabove, the system may be configured to generate different tables having different fields than what is described herein, while still staying fully within the scope of the present invention.

Figure 2:
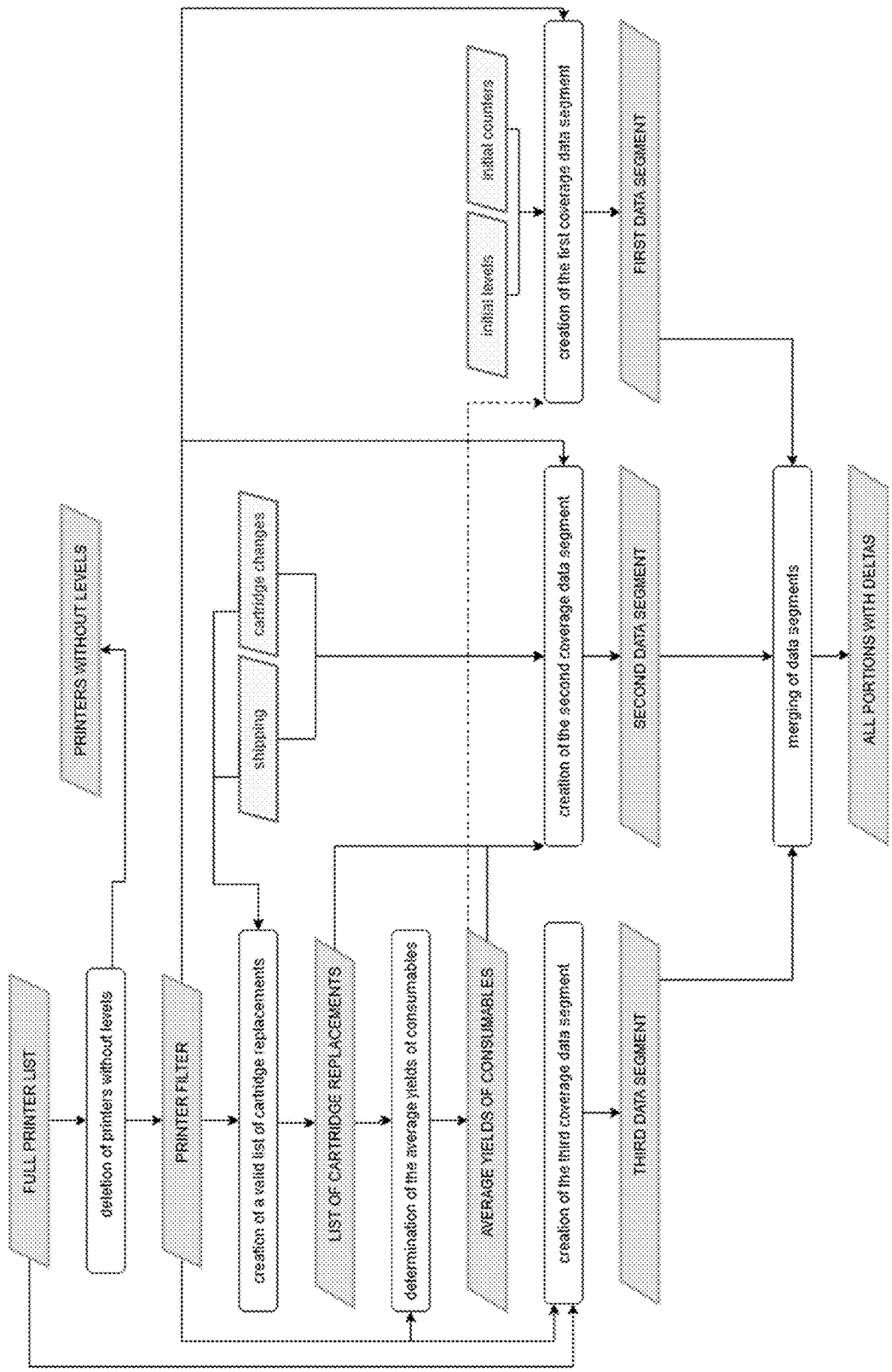
FIGS. 2 and 3 collectively illustrate an operating diagram relating to the printer fleet management system.
Figure 3:
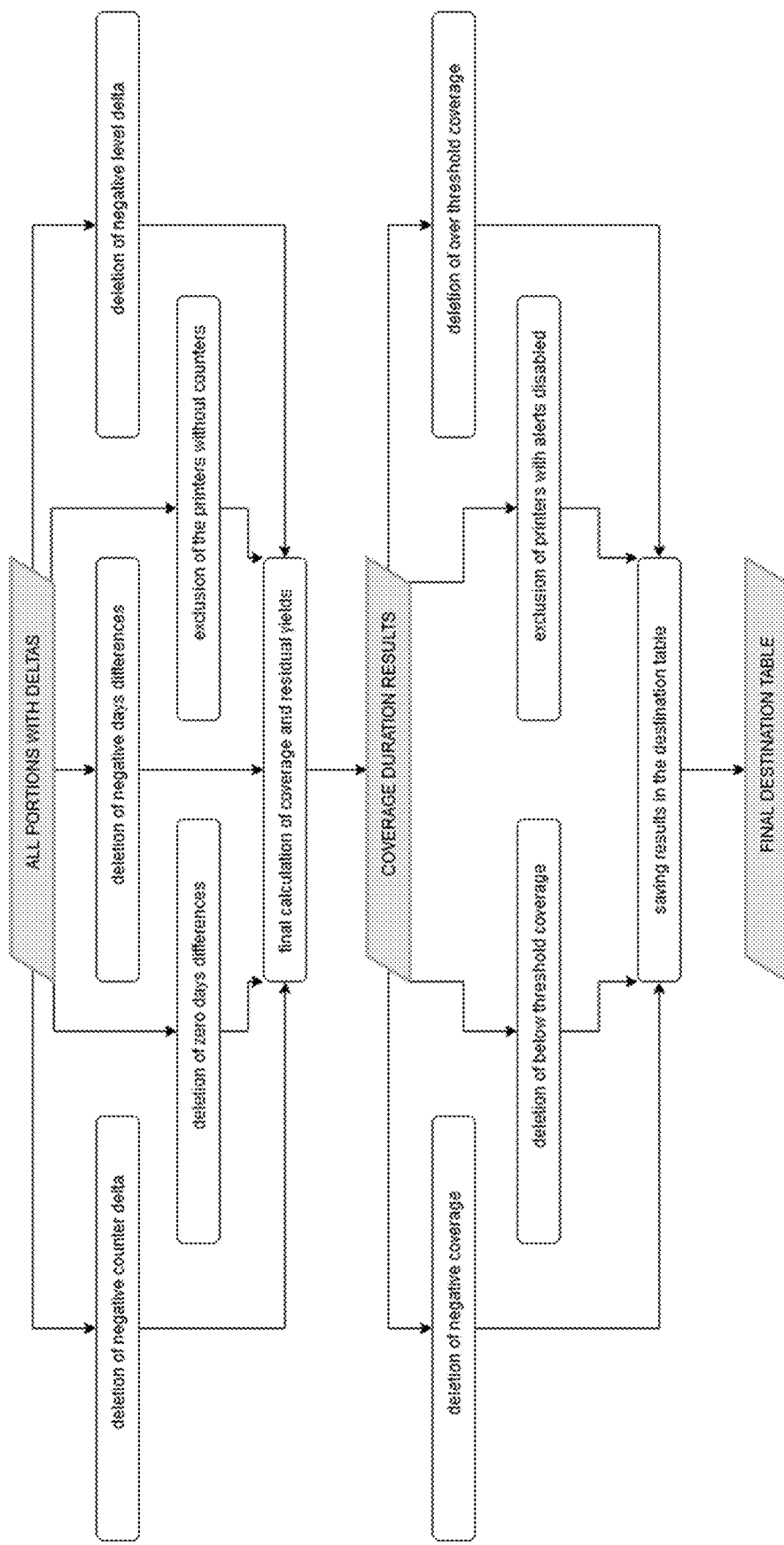

FIGS. 2 and 3, collectively, illustrate an operating diagram relating to the printer fleet management system described hereinabove. The Figures are self-explanatory to one having ordinary skill in the art.

Figure 4:
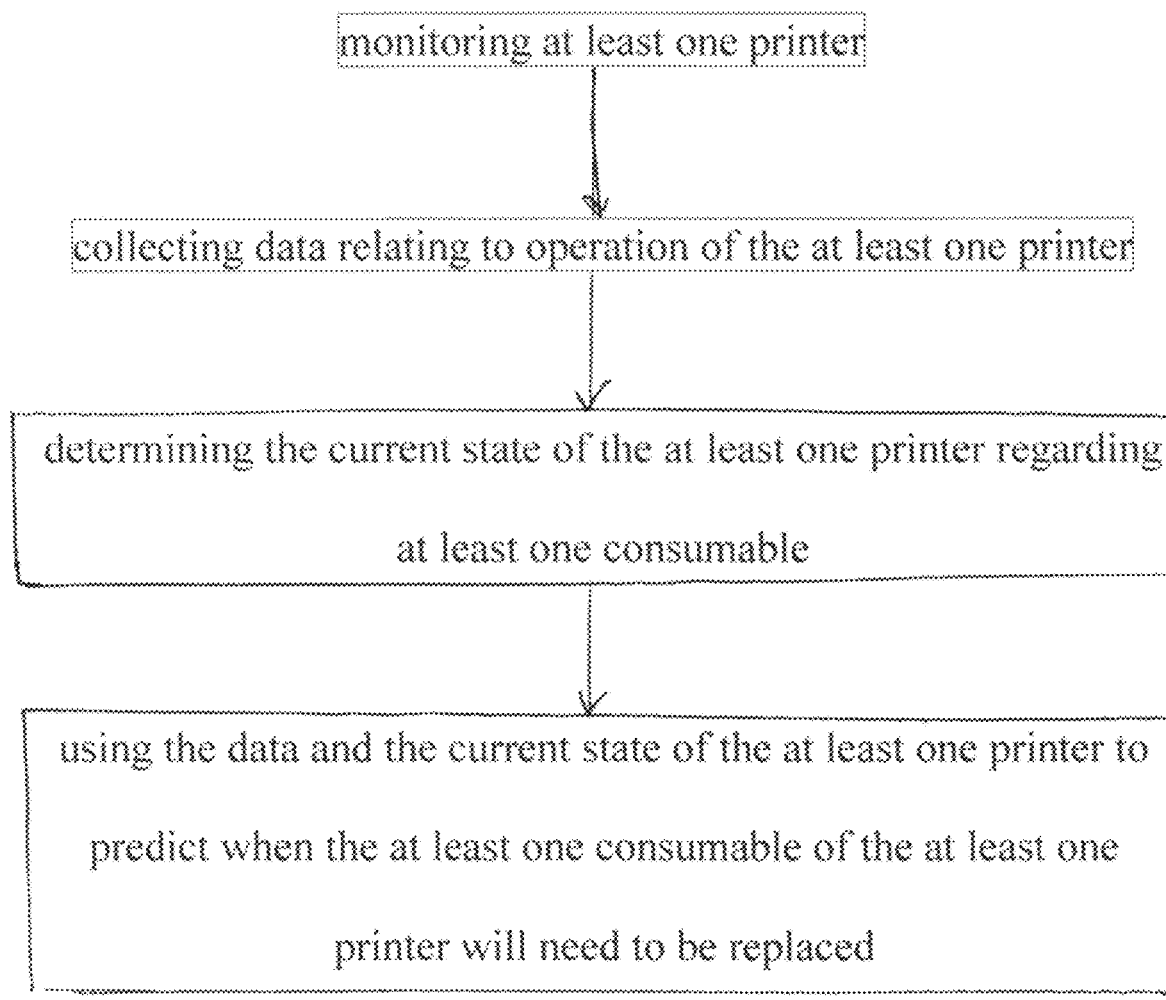
FIG. 4 is a block diagram which illustrates a method that is in accordance with an embodiment of the present invention, wherein the system shown in FIG. 1 can use to practice the method.

FIG. 4 is a block diagram which illustrates a method that is in accordance with an embodiment of the present invention. The system described hereinabove can be used to practice the method. As shown, the method includes the following steps: monitoring at least one printer; collecting data relating to operation of the at least one printer; determining the current state of the at least one printer regarding at least one consumable; and using the data and the current state of the at least one printer to predict when the at least one consumable of the at least one printer will need to be replaced.

An embodiment of the present invention effectively comprises a memory for storing data for access by an application program being executed on a data processing system, comprising a data structure stored in said memory, said data structure directing the data processing system to accurately manage the consumables of a network of printers, said data structure directing the data processing system to monitor the printers in the network, collect data relating to operation of the printers, determine the current state of the printers regarding at least one consumable, and use the data and the current state of the printers to predict when at least one consumable of at least one printer of the network will need to be replaced.

An embodiment of the present invention effectively comprises an article of manufacture comprising: a computer useable medium having computer readable code embodied in said medium for accurately managing the consumables of a network of printers, the computer readable program code in said article of manufacture comprising computer readable program code that causes the computer to collect data relating to operation of the printers, determine the current state of the printers regarding at least one consumable, and use the data and the current state of the printers to predict when at least one consumable of at least one printer of the network will need to be replaced.

While specific embodiments of the invention have been shown and described, it is envisioned that those skilled in the art may devise various modifications without departing from the spirit and scope of the present invention.

What is claimed is:

1. A computerized system for accurately managing the consumables of a network of printers, wherein the computerized system comprises a data processing system and data structure stored in memory, wherein the data structure causes the data processing system to monitor the printers in the network, collect data relating to operation of the printers, determine the current state of the printers regarding at least one consumable, use the data and the current state of the printers to predict when at least one consumable of at least one printer of the network will need to be replaced, calculate the coverage and remaining life of the cartridges installed in the printers in the network based on consumption, printed pages and the number of days between one reading and the next, create a filter list containing the printers to which the mathematical calculations can be applied, and use the filter list to create a list of cartridge replacements and a list of average durations, real and theoretical, of consumables used.

2. The computerized system as recited in claim 1, further comprising software modules installed at multiple locations which collect data from printer sensors located in printers at the multiple locations.

3. The computerized system as recited in claim 2, further comprising a server which stores, cleans and standardizes the data collected by the software modules.

4. The computerized system as recited in claim 1, where the computerized system processes the data collected by the printers to determine expected results using the mathematical calculations.

5. The computerized system as recited in claim 4, wherein the computerized system implements validation mechanisms to delete potentially incorrect data and check the degree of reliability of the results produced by the mathematical calculations.

6. The computerized system as recited in claim 1, wherein the computerized system calculates at least one of the following values: average coverage of a printer's cartridges, both current and past, broken down by type and color; average coverage of a printer, broken down by type and color; expected date of depletion of a printer's current cartridge, broken down by type and color; number of remaining pages in a printer's current cartridge, broken down by type and color.

7. The computerized system as recited in claim 1, wherein the computerized system performs validity checks.

8. A method of using a computerized system to accurately manage the consumables of a network of printers, said method comprising having the computerized system monitor the printers in the network, collect data relating to operation of the printers, determine the current state of the printers regarding at least one consumable, use the data and the current state of the printers to predict when at least one consumable of at least one printer of the network will need to be replaced, calculate the coverage and remaining life of the cartridges installed in the printers in the network based on consumption, printed pages and the number of days between one reading and the next, create a filter list containing the printers to which mathematical calculations can be applied, and create a list of cartridge replacements and a list of average durations, real and theoretical, of consumables used.

9. The method as recited in claim 8, further comprising using software modules installed at multiple locations to collect data from printer sensors located in printers at the multiple locations.

10. The method as recited in claim 8, further comprising using a server to store, clean and standardize the data collected by the software modules.

11. The method as recited in claim 9, further comprising using the computerized system to process the data collected by the printers to determine expected results using the mathematical calculations.

12. The method as recited in claim 8, further comprising using the computerized system to implement validation mechanisms to delete potentially incorrect data and check the degree of reliability of the results produced by the mathematical calculations.

13. The method as recited in claim 9, further comprising using the computerized system to calculate at least one of the following values: average coverage of a printer's cartridges, both current and past, broken down by type and color; average coverage of a printer, broken down by type and color; expected date of depletion of a printer's current cartridge, broken down by type and color; number of remaining pages in a printer's current cartridge, broken down by type and color.

14. The method as recited in claim 8, further comprising using the computerized system to perform validity checks.

15. A memory for storing data for access by an application program being executed on a data processing system, comprising a data structure stored in said memory, said data structure directing the data processing system to accurately manage the consumables of a network of printers, said data structure directing the data processing system to monitor the printers in the network, collect data relating to operation of the printers, determine the current state of the printers regarding at least one consumable, use the data and the current state of the printers to predict when at least one consumable of at least one printer of the network will need to be replaced, calculate the coverage and remaining life of the cartridges installed in the printers in the network based on consumption, printed pages and the number of days between one reading and the next, create a filter list containing the printers to which mathematical calculations can be applied, and create a list of cartridge replacements and a list of average durations, real and theoretical, of consumables used.

\* \* \* \* \*